March 25, 1969     W. R. CLENDINNING ET AL     3,435,445
INTEGRATED ELECTRO-OPTIC PASSIVE REFLECTIVE DISPLAY DEVICE
Filed Feb. 24, 1966                        Sheet 1 of 3
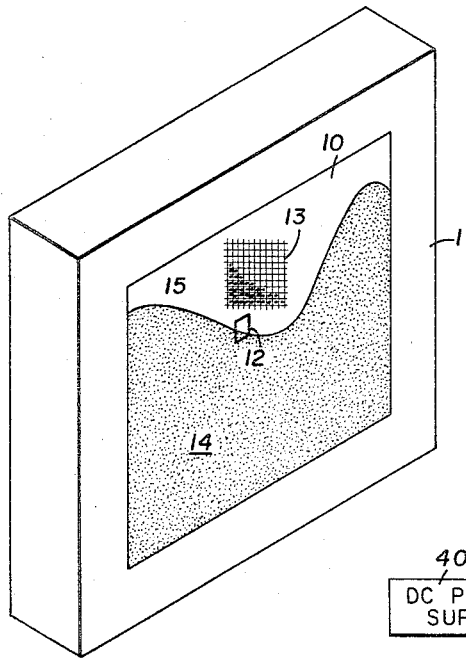
FIG. 1
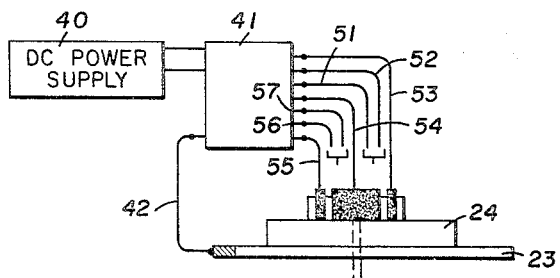
FIG. 2
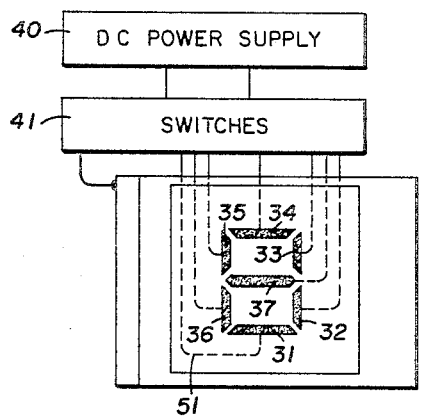
FIG. 3
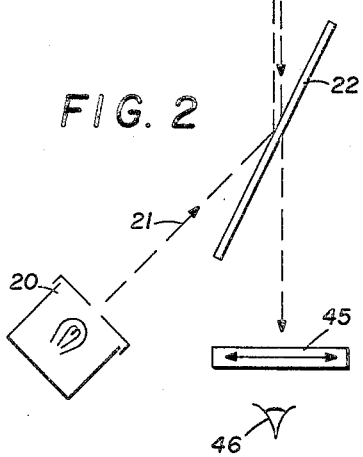
INVENTOR
WILLIAM R. CLENDINNING
DAYTON D. EDEN
ATTORNEY March 25, 1969   W. R. CLENDINNING ET AL   3,435,445
INTEGRATED ELECTRO-OPTIC PASSIVE REFLECTIVE DISPLAY DEVICE
Filed Feb. 24, 1966                       Sheet 2 of 3

INVENTOR
WILLIAM R. CLENDINNING
DAYTON D. EDEN

Richard Harris & Hubbard
ATTORNEY

INVENTOR
WILLIAM R. CLENDINNING
DAYTON D. EDEN

ATTORNEY

United States Patent Office 3,435,445
Patented Mar. 25, 1969

3,435,445
INTEGRATED ELECTRO-OPTIC PASSIVE REFLECTIVE DISPLAY DEVICE
William R. Clendinning and Dayton D. Eden, Dallas, Tex., assignors to Texas Instruments Incorporated, Dallas, Tex., a corporation of Delaware
Filed Feb. 24, 1966, Ser. No. 530,173
Int. Cl. G08b 21/00; G02f 1/26
U.S. Cl. 340—324
10 Claims

ABSTRACT OF THE DISCLOSURE

Disclosed is an electro-optic, passive, reflective, display system in which an array of islands of an electro-optic material, which change the polarization of light incident upon and passing through them in response to electrical or thermal stimuli, are used to present a visible display when viewed through a polarizing sheet. In one embodiment, the electro-optic islands are formed over a plurality of integrated circuits, each of which causes a current to flow through its corresponding electro-optic island thereby changing the polarization of the light traveling through it. In a second embodiment, the electro-optic islands are formed over a plurality of integrated circuits, each of a resistor and transistor, formed in a semiconductor base. Upon application of an electric signal to a selected circuit, a current flows through the resistor of the circuit causing it to increase the temperature of its corresponding electro-optic island and change the polarization of the light passing through it.

---

Figure 4:
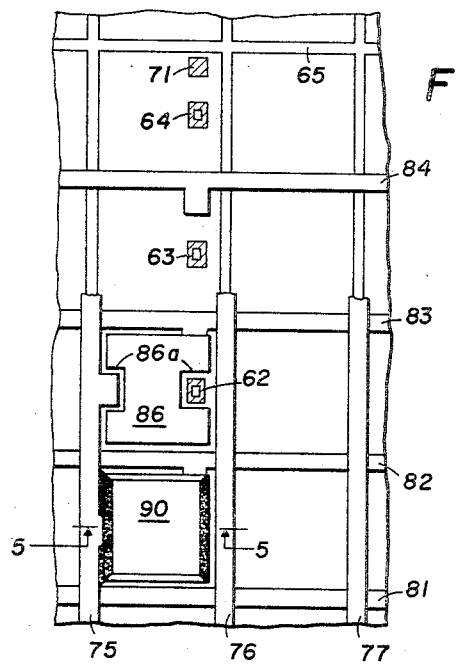

This invention relates to information displays, and more particularly to electro-optic passive information displays wherein an electro-optic material changes polarization with changes in an applied electric field.

In advanced solid-state radar and other large electronic systems utilizing displays, the lack of compatible display components has become apparent. Cathode-ray tubes currently in use require high voltages, are bulky and heavy, require an ultra-high vacuum, and often have very short useful lifetimes. Overall system reliability is frequently limited to that of the critical display component. Development of new display components has been underway for some time in the areas of electroluminescence and other light-emitting devices with some success.

Searches have been made for more effective means of information display. These searches have been particularly extensive in the field of aircraft and space vehicle applications, where a desire for fast response time, high resolution, and brightness in a high light-level environment imposes stringent requirements upon any display design.

Information displays may be roughly broken down into two categories:

(1) active or light generating displays, and
(2) passive or light reflecting displays.

A distinct disadvantage of the active display is immediately apparent when a high light-level environment, such as that ordinarily encountered in airplane and space vehicle cockpits, is considered. This is primarily due to a lack of sharp contrast between the display and the surrounding environment.

A passive display, operating on the principle of light reflection, may provide the advantage of being viewed easily in very high light-level conditions, even with direct sunlight on the viewing area. An illustration of this principle is the written page which produces no light of its own. The page when viewed in total darkness is invisible to the eye. However, as the light intensity on the page is increased, the white areas of the page increasingly reflect the incident light while the dark areas absorb it, so that the printed information can be seen by the reader. Thus the page may be read in very high light-level conditions. In total darkness, of course, the passive display may be seen by providing a small source of illumination for the display panel or screen.

It is, therefore, an object of this invention to provide a new and improved form of information display, a passive display, which utilizes the reflection of light and consequently may be easily seen in a high light-level environment. It is another object of the invention to provide a new and improved form of information display which requires a minimum of mechanical motion, which reduces the problems associated with the change of information representation from one form to another, and which provides high resolution and a fast response time.

In accordance with these and other objects, the present invention comprises a polarizer and a layer of material known as electro-optic material disposed between electric field producing elements. The changes of reflectivity of the display unit is dependent upon changes in temperature and/or the applied electric field. In accordance with one embodiment of the invention, electric field producing electrodes are arranged in an array so that selected elements of the array may be energized to represent information. When a potential is applied to the electrodes of the selected elements, the material within the electric field changes the polarization of the light propagated through the material. A reflector behind the material reflects the light back through the material so that the change in polarization produces an apparent change in reflected light intensity to form symbols or the like on the face of the display.

In this embodiment, an electro-optic array display of the present invention comprises an X–Y matrix of electro-optic modulator elements with reflective back surfaces. The successive charging of each of the elements produces an apparent absorptivity dependent on the impressed voltage.

In another embodiment of the invention, an electro-optic material, maintained at a temperature, near the Curie temperature is used as a phase retarder in conjunction with a polarizing means. Display of information is controlled by selective localized heating of the material.

Figure 5:
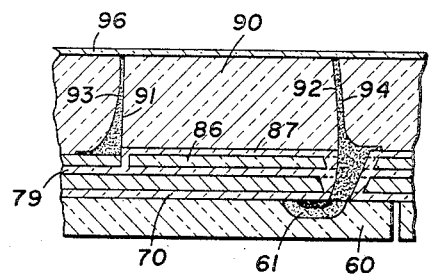
Figure 6:
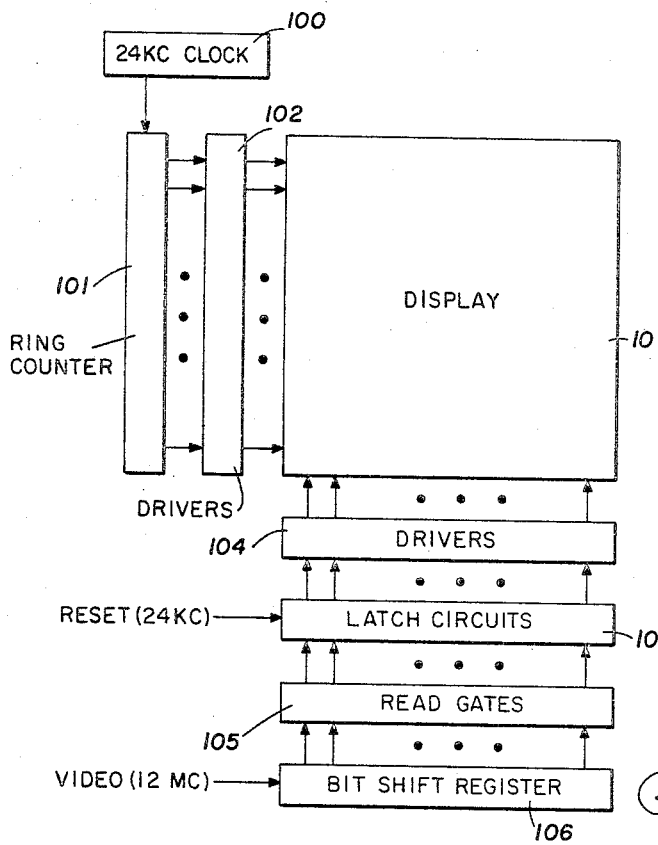
Figure 7:
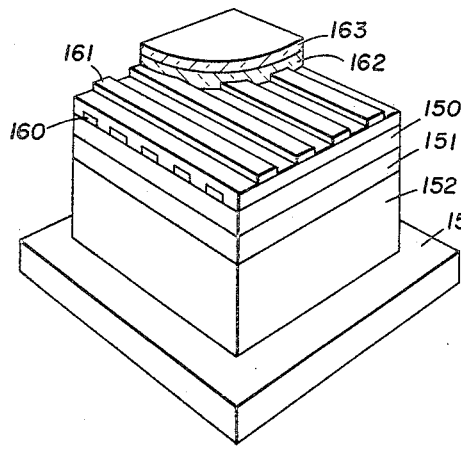
Figure 9:
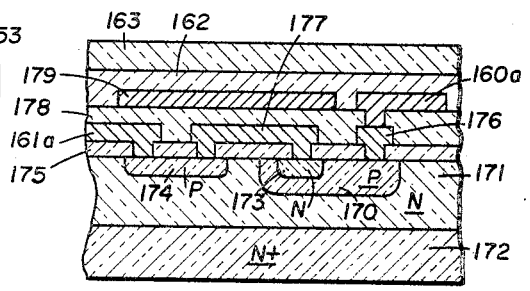
Figure 8:
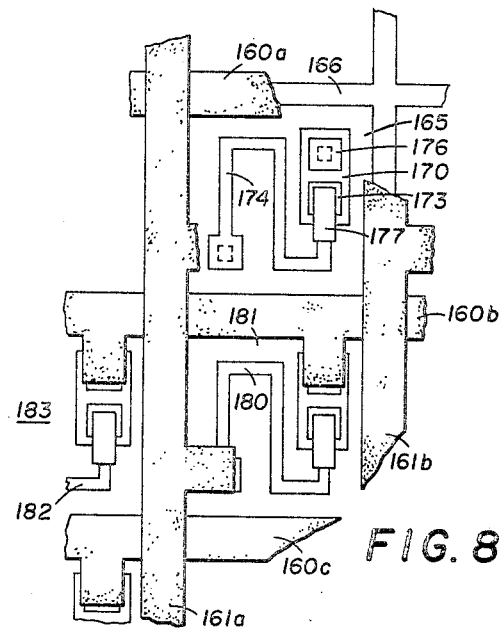
Figure 10:
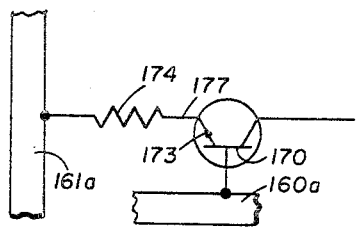
Figure 11:
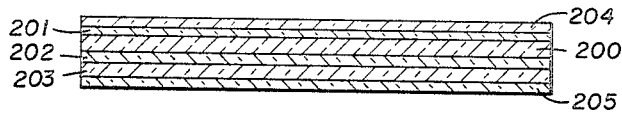

For a more complete understanding of the present invention and for further objects and advantages thereof, reference is now made to the following description taken in conjunction with the accompanying drawings in which:

FIGURE 1 illustrates a passive display unit;
FIGURE 2 is a top view of an electro-optic reflective alpha-numeric display;
FIGURE 3 is a front view of the display of FIGURE 2;
FIGURE 4 is a top view of a portion of an integrated circuit embodiment of the invention;
FIGURE 5 is a sectional view taken along lines 5—5 of FIGURE 4;
FIGURE 6 illustrates one embodiment of a scan control system;
FIGURE 7 is a perspective view of a thermally actuated embodiment of the invention;
FIGURE 8 illustrates an X–Y control logic for forming information displays in the system of FIGURES 4 and 5;
FIGURE 9 is a sectional view representative of the structure of FIGURE 8;
FIGURE 10 is an electrical analog of a portion of FIGURE 3; and
FIGURE 11 illustrates a unit employing a pair of crossed polarizers.

In FIGURE 1, a display screen 10 mounted in a housing 11 is characterized by a plurality of individual localized areas wherein apparent areal absorptivity is selectively controlled. More particularly, the portion 12 of the screen 10, shown in the enlarged portion 13, illustrates variation in absorptivity across the boundary between a dark area 14 and a light area 15. By way of example, the screen 10 may be of a size on the order of four inches by five inches, with cells spaced 0.01 inch apart. In accordance with this invention, the screen is a solid-state structure which includes integrated circuit control elements and is employed in connection with circuit logic to selectively change the polarization of all birefringent zones in the area 15 to produce an area of reflectivity having a high contrast relative to the darkened or wholly absorptive area 14.

The display of FIGURE 1 thus operates on a light-subtractive principle. In the form illustrated, the display preferably comprises many modular elements supported in a thin, two-dimensional array. Each element has electrodes, logic elements, and drive conductors to accept information from an X–Y select driver circuit. Ambient light incident upon the display is transmitted through an electro-optic modulator material and reflected back to the viewer by a reflective surface behind the material. The intensity of the reflected light from each element is then varied by changing the potential across the element.

Variable electric field control

FIGURE 2 is illustrative of one embodiment of the invention wherein electric fields are varied to control an information display. Light from a source 20 is directed as along path 21 to a Brewster's angle polarizer 22. Light from the polarizer 22 passes through a transparent conducting glass plate 23 and thence through an electro-optic crystal 24 such as potassium deuterium phosphate. A plurality of electrodes 31–37 (see FIGURE 3) are positioned adjacent the back face of the crystal 24. A D.C. power supply 40 is connected by way of switches 41 to the electrodes 31–37 and to the conducting glass plate 23. More particularly, the conductor 42 is connected from the power supply 40 through switches 41 to the plate 23. Conductors 51–57 are connected to electrodes 31–37, respectively. The electrodes are in the form of solid metal strips having faces shaped as indicated in FIGURE 3. The polished faces contact the rear surface of the crystal 24.

Light, polarized by the polarizer 22, passes twice through the crystal 24. It must pass through the polarizer 22 and then through an analyzer 45 through which it is viewed by observer 46. When the voltage applied to a given electrode is zero, there is no birefringence, and the electro-optic crystal 24 acts like an ordinary transparent material. With the polarization angles of polarizer 22 and analyzer 45 at 90° with respect to each other the field viewed by observer 46 is completely dark. However, when voltage is applied to any one of the electrodes 31–37, the polarized light entering the crystal 24 is separated into two equal components polarized at 90° with respect to each other. One is a fast ray and the other is a slow ray. On emerging from the crystal, they are out of phase by an amount depending upon the applied voltage. The rays recombine to form elliptically polarized light which produces a variable amplitude modulation of the beam as viewed through the analyzer 45.

Electro-optic materials

To achieve useful modulation, materials for crystal 24 should be one of those having a large electro-optic coefficient which allows the birefringence to be varied by application of an electric field. The magnitude of the electro-optic effect and its optimum application depends upon the crystallographic nature of the material and its atomic properties. While the nature of that dependence is to a great extent only empirically or qualitatively understood at the present time, it has been found that materials such as potassium dihydrogen phosphate (KDP), potassium dideuterium phosphate (KD*P), or a solid solution of potassium tantalate and potassium niobate (usually $KT_{0.65}N_{0.35}$) may be employed. KD*P is currently available in usable quantities and quality, whereas KTN is available only in research quantities.

KD*P is a linear electro-optic material with a Curie temperature of $-60°$ C. KTN is a quadratic material, whose Curie temperature can be varied with material stoichiometry. The value of the Curie temperature for a 65–35 mixture is about 20° C. KTN exhibits the highest known electro-optic effect at room temperature and will work as a light modulator at reasonable voltage levels.

The field-induced birefringence of KTN is given by $$n_e - n_o = \frac{n_o^3}{2}(g_{11} - g_{12})(\epsilon_o x E)^2$$

$n_o$ is the unperturbed index or refraction of the cubic material;

$g_{11} - g_{12}$ is the appropriate quadratic electro-optic coefficient;

E is the applied field $V/d$; d is the crystal thickness across which the voltage V is applied;

$\epsilon_o$ is the permittivity of free space; and $x$ is the dielectric susceptibility.

The effective half-wave potential $V\lambda/2$ for KTN, i.e., the minimum signal voltage required to change the linear polarization of the incoming light into an orthogonally polarized state (thus producing 100% modulation) is found from $$\frac{2\pi l}{\lambda_o}\Delta(n_e - n_o) = \pi x 1/2$$

where:

the factor of ½ is included because the light traverses the crystal 24 twice as illustrated in FIGURE 2;

$\lambda_o$ is free space optical wavelength of the ambient illumination; and $l$ is the crystal thickness along the light path.

By substitution, $$V\lambda/2 = \sqrt{\frac{\lambda_o}{2n_o^3(g_{11}-g_{12})(\epsilon_o x)^2}} \frac{d}{\sqrt{l}}$$

where:

d is the crystal dimension along the applied field direction.

Substituting $\lambda_o = 6000$ A., $x = 10^4$, and $(g_{11} - g_{12}) = 0.174$ m.$^4$/coulomb$^2$, $$V\lambda/2 \cong 400 \frac{l}{\sqrt{l}}$$

for d and l in centimeters.

To minimize $V\lambda/2$, it is advantageous to make the individual modulator elements as thin as possible in the direction of applied field, d, (in this case perpendicular to the light path) so far as consistent with other constraints. For a reasonable element configuration $d = 0.1$ mm. and $l = 0.4$ mm.

$$V\lambda/2 \cong 63.4 \text{ volts}$$

In an alternative operational mode, a D.C. bias voltage, $V_B$, is impressed across d, where $V_B$ is large enough to produce $n\pi/2$ phase retardations.

From the previous equation, $$(V_n\lambda/2)^2 = \frac{n\lambda_o d^2}{2n_o^3(g_{11}-g_{12})(\epsilon_o x)^2 l}$$

By expansion of $(V_B + V_S)^2 \cong V_B^2 + 2V_B V_S$, the incremental signal voltage, $V_S$, required to produce the $(n+1)$th phase retardation is given by $$V_S = V_{(n+1)}\lambda/2 - V_n\lambda/2 \cong 8 \times 10^4 \frac{1}{V_B} \frac{d^2}{l}$$

In this case, $V_S$ can be arbitrarily small subject to the constraint of a maximum field $V/d$ which will produce breakdown or other irreversible phenomena. Known values of $(V_B/d)_{max}$ have varied from 10 kv. to 14 kv. per centimeter. Using 10 kv. per centimeter and a geometric ratio $(d/l)$ of ¼ one obtains $$V_s \cong 2 \text{ v.}$$

KTN is a ferro-electric material having a number of physical and chemical properties desirable for display use. It is a perovskite, the parent compounds $KTaO_3$ and $KNbO_3$ forming a continuous series of solid solutions. The parent compounds are quite compatible because they have almost identical unit cell dimensions. The Curie temperature of a particular mixture can be varied over a wide range depending on the ratio of constituents.

Crystals of KTN have an electro-optic coefficient (expressed as a function of polarizability) which is comparable with other electro-optic materials and gives rise to a large electro-optic effect at room temperature due to its large dielectric constant ($\epsilon \cong 10^4$) near the Curie temperature.

The crystal faces are parallel to the cubic faces of the lattice to within ±0.5 degree. The crystal is clear and colorless. With the unaided eye, no imperfection can be seen. The dielectric susceptibiilty, $x$, of a KTN crystal was measured from 10° C. to 45° C., and it was found that susceptibiilty above 25° C. can be expressed as $$X = \frac{1.5 \times 10^5}{T - 14}$$

where the temperature, T, is in °C. Below 25° C., susceptibility deviates from the ideal Curie-Wiess law. The behavior of the susceptibility indicates that this sample undergoes a second-order ferro-electric transition; i.e., the susceptibility is not discontinuous as is the first-order transition in other materials such as barium titanate.

*Operational modes*

Modes of operation which may offer advantages in certain applications include: (1) operation in the paraelectric phase with field-induced transitions into the ferro-electric phase, (2) thermally induced transitions between a highly birefringent (paraelectric or ferro-electric) state and a lower activity state or thermally induced transitions across the Curie temperature, and (3) combinations of item (2) with a biasing field.

The optimum operating mode selected will depend on display requirements, such as response time, element persistence, shades of gray required, applied voltage for $V_S$ and $V_B$, environmental temperature, and required insensitivity to ambient temperature fluctuations.

FIGURES 4 and 5 illustrate a display configuration embodying integrated semiconductor circuit construction. A silicon substrate 60 has a plurality of diodes 61–64 diffused in the upper surface in a regular pattern of rows and columns. Only one diode column is shown in FIGURE 4, with only one of the diodes, diode 61, being shown in the sectional view of FIGURES 5. The silicon substrate 60 is etched to form isolation channels 65 leaving a pattern of square islands as viewed from the surface. an insulating layer 70 is formed over the surface of substrate 60 and over the diodes 61–64. Contacts, such as the contact 71, are formed in each of the square surface areas by etching and evaporation. Electrodes 81–84 extending in the X-direction are formed over the insulating layer 70. An insulating layer 79 is formed over the X-electrodes 81–84. Y-electrodes 75–77 are formed over the insulating layer 79. A reflector 86 also overlays a substantial portion of each island, having indentations 86a on each of the sides to avoid overlaying the zones occupied by the diode on one side and a contact on the other side. An insulating layer 87 extends over the reflector 86 and over the Y-electrodes 75–77. An electro-optic material is located on the surface of the insulating layer 87. The layer is surface-etched down to the insulating layer 87, so that there remains an array of planar topped rectangular islands or pedestals, such as the pedestal 90, FIGURE 4, having sloping sides 91 and 92, FIGURE 5. The sloping sides 91 and 92 are coated with conductive electrodes 93 and 94 respectively. The electrode 93 is in electrical contact with the Y-electrode. The electrode 94 extends through the insulating layers 87, 79, and 70 to contact the diode 61. By application of voltages to a selected pair of X and Y-electrodes, the polarization of light transmitted therethrough of a given pedestal may be controlled.

With pedestals formed on 0.01 inch centers, an array of 400 by 500 separate pedestals can be provided on a 4 inch by 5 inch display unit. A polarizing layer 96 over the surface of the pedestal 90 polarizes incident light. The display unit as viewed through the polarizer-analyzer 96 employs the change in polarization produced by varying the electric field applied to the electro-optic pedestals, to produce information displays apparent at the face of the display unit.

The unit provides a subtractive light display which can be used under widely varying ambient light conditions. It has a thin, flat plate-like geometry. The electro-optic display element may be self-latching because it exhibits high electrical capacitance. Preferably, KTN will be employed so that signal voltages will be low enough for compatible drive and control circuitry in integrated semiconductor form. The unit will provide multiple shades of gray and possibly a multi-color display. Resolution of 100 lines per inch is employed with the response time commensurate with other integrated circuit arrays. Sixty frames per second and 500 vertical lines per second may be employed. Power consumption is negligible. Lifetime and ruggedness are comparable to present-day integrated circuit arrays.

Input signal decoding is necessary to select any one of the total number of matrix cells. In utilizing digital input signals, a decoding unit may be of the type currently employed for selection of elements in arrays such as in a computer memory. The electro-optic display may employ two diodes forming a negative AND gate or a transistor at each intersection of X and Y grids, only one diode per intersection being shown in FIGURE 5.

*Scan control*

FIGURE 6 illustrates a line at a time scan control for the display system 10. In this embodiment, a 24 kc. clock 100 is coupled to a ring counter 101 which serves to apply square wave gating pulses at the 24 kc. rate to the successive X-input channels 102a–102n. Thus, four hundred drive elements 104 leading to the Y-leads. Five X-direction or along the Y-axis. Five hundred latch circuits 103 are provided on the Y-channels, with five hundred driven elements 104 leading to the Y-leads. Five hundred read gates 105 are actuated at the 24 kc. rate. The latch circuits 103 are reset at the 24 kc. rate.

A five hundred bit shift register 106 receives input information and is actuated at a video frequency of, for example, 12 mc. Thus, the ring counter 101 scans the X-leads to produce a vertical scan. To drive the Y-leads, the shift register 106 is driven at the 12 mc. clock rate. To avoid the need for a second shift register, gate circuit 103 of the latching type is employed. Each time a line of new information is fed to the shift register 106 as at the rate of one line every 40 microseconds, a 24 kc. clock pulse dumps the information into the latching gate 103 which holds for the next 40 microseconds, while the Y-leads are driven. Just prior to dumping the shift register 106 again, the latched gates 103 are reset and the vertical scan ring counter 101 shifts to the next X-lead.

While the embodiment illustrated in FIGURES 4 and 5 has been described as being formed in connection with a silicon substrate, it will be appreciated that other materials may be employed. For example, germanium or gallium arsenide may be used. Further, the specific form of the logic elements may be varied depending upon the array and its requirements. For example, it may be desirable to provide an array in accordance with this invention in which alpha-numeric symbols only are required. In such case, it would be necessary only to provide for application of electric fields to a limited number of segments of the array and more specifically to areas which might conform to the electrodes of FIGURE 2. In this case, it may be more convenient to provide the access logic elements remote from the location of a given segment of the birefringent material. A limited number of leads could thus be employed extending from the localized areas to be actuated to perimetral circuit components. In such case, a semiconductor substrate would not be required in the form illustrated in FIGURES 4 and 5. Rather, an insulating substrate would be provided with the necessary circuit leads thereon over which the birefringent material would be passed and interconnected. However, for a versatile universal display, an integrated circuit construction of the type shown in FIGURES 4 and 5 is preferred.

*Thermally activated electro-optic mode*

As above mentioned, the Curie temperature of KTN can be selected by varying the proportions of the constituents. This fact is employed in accordance with a second mode of operation wherein a KTN crystal, or an array of ferro-electric elements such as of KTN, is backed by a reflector, the Curie temperature of the ferro-electric elements being above a reference temperature level. Resistor elements are located in an ordered array and in heat-transfer relation to the KTN material so that the temperature of the KTN material can be locally driven through the Curie temperature by causing current to flow through any given resistor. This changes the polarization of light passing through localized areas of the KTN crystal in accordance with information signals.

In this embodiment, it will be understood that an X–Y array of control input leads will be provided for selecting localized areas to be heated.

Thermal persistence in the KTN material, like persistence in a cathode ray tube, permits memory in the display. Where the structure employs thermal integration of power pulses with a transistor diffused adjacent to each resistor, a "diode" matrix interconnection arrangement using two layers of evaporated (X–Y) metal leads is suitable for heating control. Such a matrix structure is shown in FIGURE 8 which includes a portion of the control array of FIGURE 7.

Referring to FIGURE 7, a silicon semiconductor layer 150 is supported on a temperature stabilized substrate 151. The substrate 151 is mounted on a thermal insulator 152 which in turn is supported on an ambient heat sink 153. The silicon layer 150 has an array of X leads 160 and an array of Y leads 161. The X leads and the Y leads are interconnected by means of diodes and resistor elements formed in and/or on the silicon semiconductor layer 150.

An electro-optic layer 162 is located over the top of the X–Y grid. A polarizer 163 is located on top of the electro-optic layer 162. As best seen in FIGURE 8, a silicon area 165 has the upper boundary 166 located beneath an electrode 160a with the lower boundary positioned beneath the X electrode 160b. Electrodes 160a, 160b, and 160c lie beneath the Y electrodes 161a and 161b. The electrodes thus form a grid on the upper surface of the silicon layer 160. As best seen in FIGURE 9, a transistor and a resistor are formed in the silicon section 165. The transistor is used as a diode connected in series with the resistance. More particularly, a P-type base zone 170 is formed in the N-type layer 171. N-type layer 171 overlays an N+ layer 172. An N-type emitter zone 173 is then formed in a portion of the P-type zone 170. A strip resistor formed in the silicon layer 171 is represented by the P-type zone 174. An insulating layer 175, such as silicon dioxide, is formed over the top of the layer 171. The X electrode 160a is then connected by way of the base contact 176 to the base 170. A connecting electrode 177 is connected to the emitter 173 and to one end of the resistor 174. The electrode 161a is connected to the other end of the resistor 174. An insulating layer 178 serves electrically to isolate the X electrodes 160a and the Y electrodes 161a.

The resistor 174 is shown as an elongated serpentine resistor in FIGURE 8, thus serving, when energized, to apply heat to the bottom surface of the electro-optic layer 162. A reflector 179 is located beneath the electro-optic layer 162 in the region of the resistor 174.

As shown in FIGURE 10, the junction between the base 170 and the emitter 173 is used as a diode. By means of such control, the resistor 174 will be heated by application of the proper voltages to the X electrode 160a and the Y electrode 161a. In a similar manner, a resistor 180 serves to control the section 181 and resistor 182 serves to control the section 183. Upon current flow through selected resistors, the resistors heat up. The increase in heat in the resistors elevates the temperature of portions of the electro-optic layer 162 that overlie the selected resistor. When the temperature of any portion of the electro-optic material passes through the Curie temperature, the polarization effect is eliminated or removed. Thus any light incident upon the surface of the display will be reflected as by the mirror 179. By selection of proper leads and therefore the resistors to be energized, complex display patterns may be formed.

The system is formed of emitter-follower transistor-resistor pairs which are electrically isolated by a planar process employing junction isolation. A mesa construction likewise may be employed.

Excessive power levels are minimized by mounting the silicon array on the temperature stabilized heat sink 153. The heat sink is adjusted in temperature and held at a given level relative to the Curie temperature of the layer 162. For example, where the heat sink is maintained at an ambient or room temperature, the Curie temperature of the layer 162 may be at about 100° F.

It is desirable that the display turn on and off sharply, thus requiring that the apparent absorptivity of the display unit change quickly when the Curie temperature is reached and revert sharply to its original state when the power is turned off and the material cools below the Curie temperature. By selecting a material having a Curie temperature substantially above the reference temperature, a large temperature difference will tend to cause the display to turn off quickly. Power can be applied to the heater at levels that will achieve rapid onset of the display.

The construction is such that the electrical resistance insures electrical isolation between the leads and resistors and thermal isolation avoids heat spill-over. In addition, the system has thermal conductivity so as to allow quick cooling of the resistors and the electro-optic material after each display. The temperature stabilized substrate 151 is mounted on a thermal insulator, such as a ceramic foam, to provide thermal isolation relative to the supporting structure represented by the heat sink 153.

While KTN appears to be preferred for use in a thermally activated reflective display, other materials may be employed. For example, in a cryogenic system, KD*P will be suitable. The Curie temperature of this electro-optic material is about −65° C. When heated to pass through this temperature, the polarization changes rather than being removed as in the case of KTN.

From the foregoing it will be seen that this embodiment of the invention involves a unit which can be used as a panel display comprised of many elements, each of which functions as a light modulator. A birefringent material whose birefringence is a function of temperature (such as electro-optic materials near their Curie temperature) is used as the phase retarder. The display is controlled by the degree of heating imposed at each such element. The specific operational mode (the thickness, the choice of materials, the bias voltage, etc.) will depend upon the desired operating conditions. The storage or thermal-decay time characteristics of the display can then be varied over a wide range depending upon the intended use. Preferably, since there is a flexibility in the choice of the operating range, the system will be optimized with respect to the thermal properties to achieve the desired power requirement and the cooling response time.

In either the mode represented by the systems of FIGURES 2–5 or the mode represented by the system of FIGURES 7–10, the thickness of the electro-optic material may dictate the use of a pair of crossed polarizers as shown in FIGURE 11. In this embodiment, the electro-optic material 200 is located between electrodes 201 and 202. A front polarizer 204 and a back polarizer 203 are positioned in the light path leading to and from the reflective surface 205. The electro-optic material may be in matrix form as described above. The polarizers 203 and 204 are crossed so that no light will be reflected from the reflector 205 until the light is properly rotated by the birefringent material. In general, however, the parameters may be selected to eliminate the necessity for the front polarizer 204.

In accordance with one mode of operation of the thermally activated system shown in FIGURES 7–10, a bias voltage is employed. In order to minimize the dependence upon the regulation of the bias voltage, and the ambient temperature, a full wave rectified A.C. voltage is applied as a bias to the electro-optic material. This serves to produce a RMS level of reflectivity, upon which signal information is then superimposed to provide a highly contrasting reflective display.

What is claimed is:
1. A passive display device comprising:
   (a) a substrate of semiconductor material with a plurality of channels therein forming electrically isolated rows and columns of islands of said material,
   (b) a plurality of diodes, one in each of said islands,
   (c) a first layer of electrically insulating material overlying said substrate and said diode, said first layer of electrically insulating material having a hole therein over each island to expose a portion of said island,
   (d) a first plurality of electrodes over said first layer of electrically insulating material, each electrode contacting each island along a row of islands through said holes in said first layer of electrically conducting material,
   (e) a second layer of electrically insulating material overlying said first layer of electrically insulating material and said first plurality of electrodes,
   (f) a second plurality of electrodes over said second layer of electrically insulating material, each electrode corresponding in position to a column of islands,
   (g) a plurality of reflective elements, each positioned on said second layer of electrically insulating material over one of said islands, and
   (h) a plurality of pedestals of an electro-optic material, each pedestal having a conducting material on two of its sides and positioned over one of said reflective elements such that the conducting material of one of the sides of said pedestal contacts one of said plurality of electrodes along a column of islands, and the conducting material of the other of said sides of said pedestal extends through said first and second electrically insulating layer to contact said diode, whereby when a source of electrical potential is applied between an electrode extending along a row of said islands and an electrode extending along a column of said islands a current will flow through the diode in the island corresponding to the intersection of said electrodes and through the electro-optic material thereby to change the polarization of light waves passing through said material, and whereby when polarized light is directed upon said display device, and said display device is viewed through a polarizing means, images are seen corresponding to the pattern formed by the islands under the intersection of electrodes to which said source of electrical potential is applied.

2. The display device of claim 1 wherein said substrate is silicon.
3. The display device of claim 1 wherein said electro-optic material is a solid solution of potassium tantalate and potassium niobate.
4. The display device of claim 1 wherein said electro-optic material is potassium dideuterium phosphate (KD*P).
5. The display device of claim 1 wherein said electro-optic material is potassium dihydrogen phosphate (KDP).
6. A passive display device comprising:
   (a) a substrate of semiconductor material with a plurality of channels therein to form electrically isolated rows and columns of islands of a face thereof,
   (b) a plurality of transistors, one in each island,
   (c) a plurality of resistances, one in each island contacting the emitter of the transistor in said island,
   (d) a first layer of electrically insulating material over said substrate and said transistors and resistors, said first layer of electrically insulating material having a hole therein over each island to expose a portion of the base region of the transistor therein,
   (e) a first plurality of electrodes overlying said first layer of electrically insulating material, each electrode contacting the base region of the transistors along a row of islands through said holes in said first layer of electrically conducting material,
   (f) a second layer of electrically insulating material overlying said first layer of electrically insulating material and said first plurality of electrodes,
   (g) a second plurality of electrodes overlying said second layer of electrically insulating material, each electrode corresponding to a column of islands and contacting through said first and second electrically insulating layers the resistor formed in each of said islands along the corresponding column of islands,
   (h) a plurality of reflective elements, each positioned on said second layer of electrically insulating material over one of said islands,
   (i) a plurality of pedestals of an electro-optic material each positioned over one of said reflective elements, and
   (j) means for maintaining said pedestals of electro-optic material below their Curie temperature,
whereby when a source of electrical potential is supplied between an electrode extending along a row of said islands and an electrode extending along a column of said islands, a current flows through the transistor and resistor at the intersection of said electrodes, thereby elevating the temperature of the electro-optic material thereunder to a temperature above its Curie temperature, and thereby changing the polarization of the light passing therethrough, whereby when polarized light is directed upon the surface of said display device and said device is viewed through a polarizing means, images are visible in said polarizing means corresponding to the pattern formed by the islands under the intersection of electrodes to which said electrical potential is applied.

7. The display device of claim 6 wherein said substrate is silicon.

8. The display device of claim 6 wherein said electro-optic material is a solid solution of potassium tantalate and potassium niobate.

9. The display device of claim 6 wherein said electro-optic material is potassium dideuterium phosphate (KD*P).

10. The display device of claim 6 wherein said electro-optic material is potassium dihydrogen phosphate.

References Cited

UNITED STATES PATENTS

| | | | |
|---|---|---|---|
| 2,909,973 | 10/1959 | Koelsch et al. | 350—150 |
| 3,312,957 | 4/1967 | Fleisher et al. | 350—150 |
| 3,349,677 | 10/1967 | Young | 340—324 |
| 3,352,619 | 11/1967 | Meglia | 350—150 |
| 3,356,438 | 12/1967 | Macek et al. | 350—150 |

OTHER REFERENCES

Folberth, IBM Publication, Semiconductor Element Acting As Light Modulator, December 1965.

JOHN W. CALDWELL, *Primary Examiner.*

ALAN J. KASPER, *Assistant Examiner.*

U.S. Cl. X.R.

350—150, 157, 160; 317—99; 315—169